United States Patent
Hanai et al.

(10) Patent No.: US 6,920,641 B1
(45) Date of Patent: Jul. 19, 2005

(54) TRANSMIT DEVICE AND METHOD THEREOF, RECORD/PLAY DEVICE AND METHOD THEREOF AS WELL AS RECORDING SYSTEM AND MEDIA

(75) Inventors: Tomoyuki Hanai, Kanagawa (JP); Yasutomo Nishina, Chiba (JP); Masahiko Sato, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/320,702

(22) Filed: May 27, 1999

(30) Foreign Application Priority Data

May 29, 1998 (JP) .......................................... 10-149536

(51) Int. Cl.[7] .......................... H04N 7/16; H04N 7/173; H04N 5/445; G06F 3/00; G06F 13/00

(52) U.S. Cl. .......................... 725/142; 725/38; 725/40; 725/44; 725/45; 725/55; 725/59; 725/61; 725/87; 725/89; 725/100; 725/133; 725/134; 725/141; 725/153; 386/1; 386/46; 386/83; 386/109; 386/112

(58) Field of Search ........................ 725/37–61, 87–89, 725/95, 96, 100, 133, 134, 141–142, 153; 386/1, 46, 83, 109–112

(56) References Cited

U.S. PATENT DOCUMENTS

| | | | | |
|---|---|---|---|---|
| 4,808,992 A | * | 2/1989 | Beyers et al. | 340/825.24 |
| 5,861,906 A | * | 1/1999 | Dunn et al. | 725/87 |
| 5,877,906 A | * | 3/1999 | Nagasawa et al. | 360/15 |
| 5,978,855 A | * | 11/1999 | Metz et al. | 709/249 |
| 6,005,561 A | * | 12/1999 | Hawkins et al. | 715/500.1 |
| 6,115,341 A | * | 9/2000 | Hirai | 369/59.13 |
| 6,151,360 A | * | 11/2000 | Kato et al. | 375/240.03 |
| 6,311,011 B1 | * | 10/2001 | Kuroda | 386/46 |
| 6,378,129 B1 | * | 4/2002 | Zetts | 725/94 |
| 6,459,850 B1 | * | 10/2002 | Bruls | 386/109 |
| 2001/0003554 A1 | * | 6/2001 | Mori et al. | 386/111 |
| 2002/0012530 A1 | * | 1/2002 | Bruls | 386/109 |

FOREIGN PATENT DOCUMENTS

| | | | | |
|---|---|---|---|---|
| JP | 2000184320 A | * | 6/2000 | H04N/5/76 |
| WO | WO 9222983 A | * | 12/1992 | H04N/5/781 |

* cited by examiner

*Primary Examiner*—John Miller
*Assistant Examiner*—Michael W. Hoye
(74) *Attorney, Agent, or Firm*—Frommer Lawrence & Haug LLP; William S. Frommer; Samuel S. Lee

(57) ABSTRACT

A transmit device and method, a record/play device and method, a record system as well as a media allowing selection of the ideal record media by the receiver. The EPG data generator of a transmit device generates an EPG (Electronic Program Guide) showing the scheduled transmission of the program to be broadcast An editor generates supplemental information containing information indicating the program data quantity, adds the supplemental information to the EPG and a multiplexer transmits the EPG added with the supplemental information.

14 Claims, 13 Drawing Sheets

F I G. 5
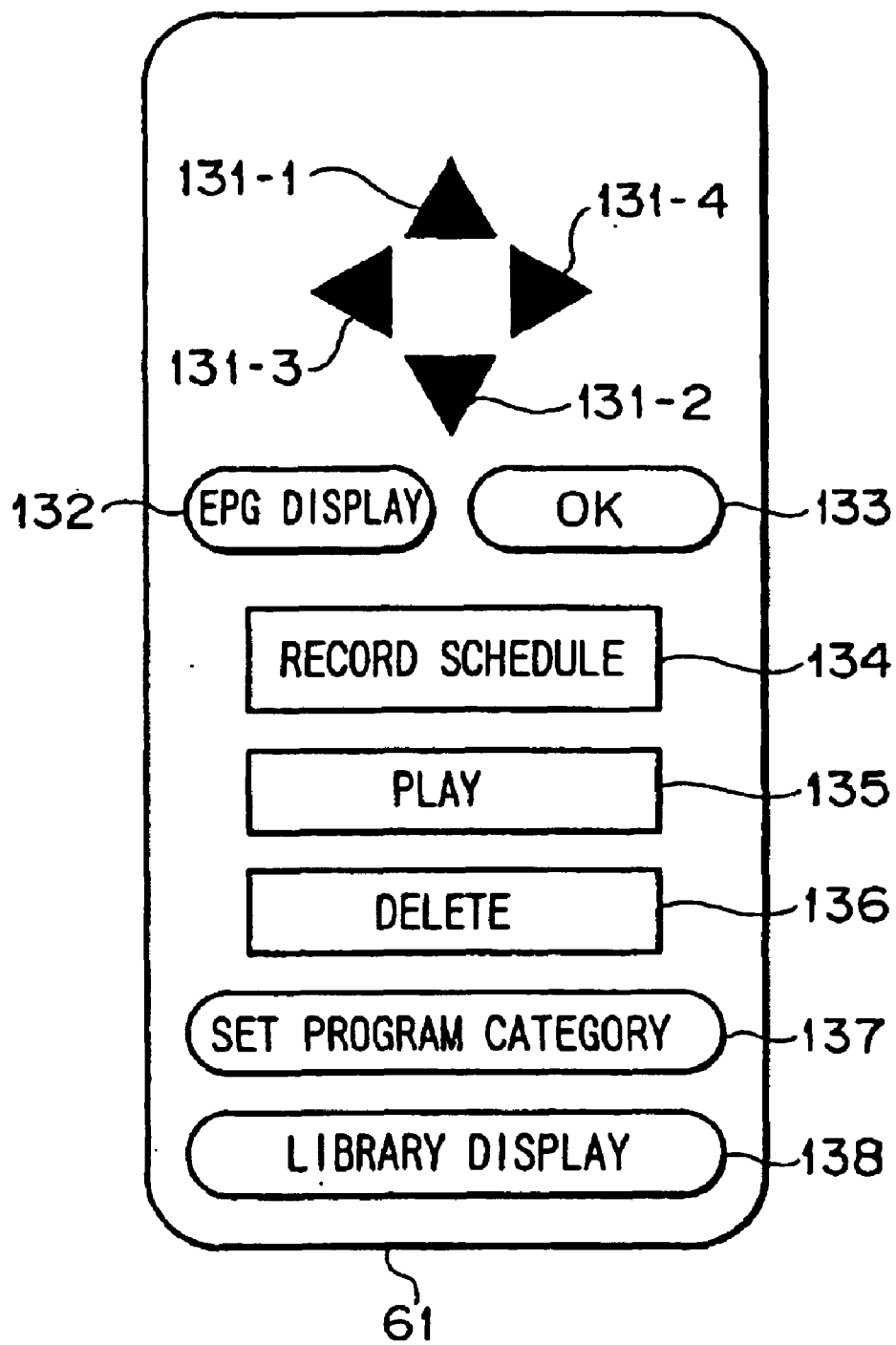

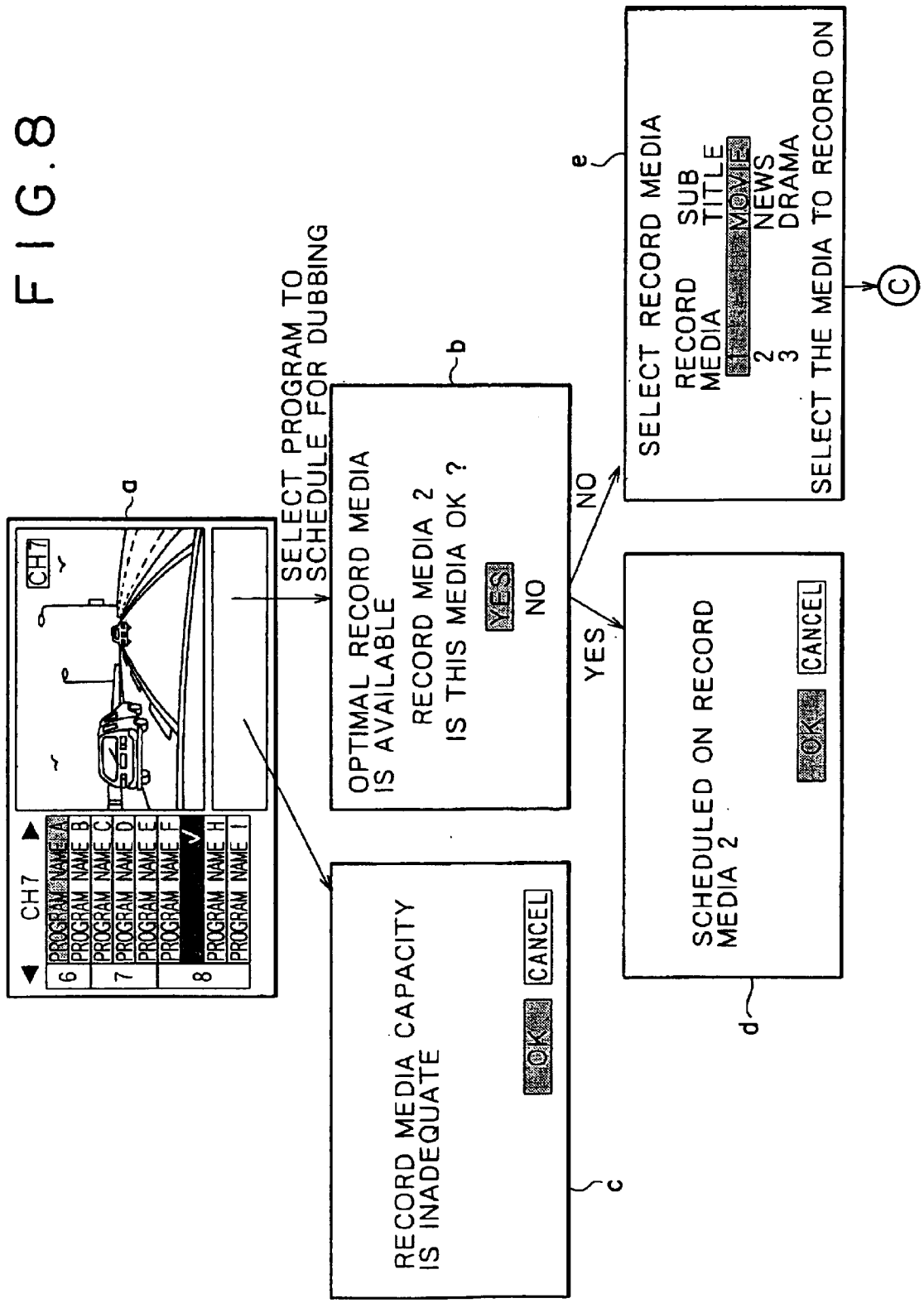

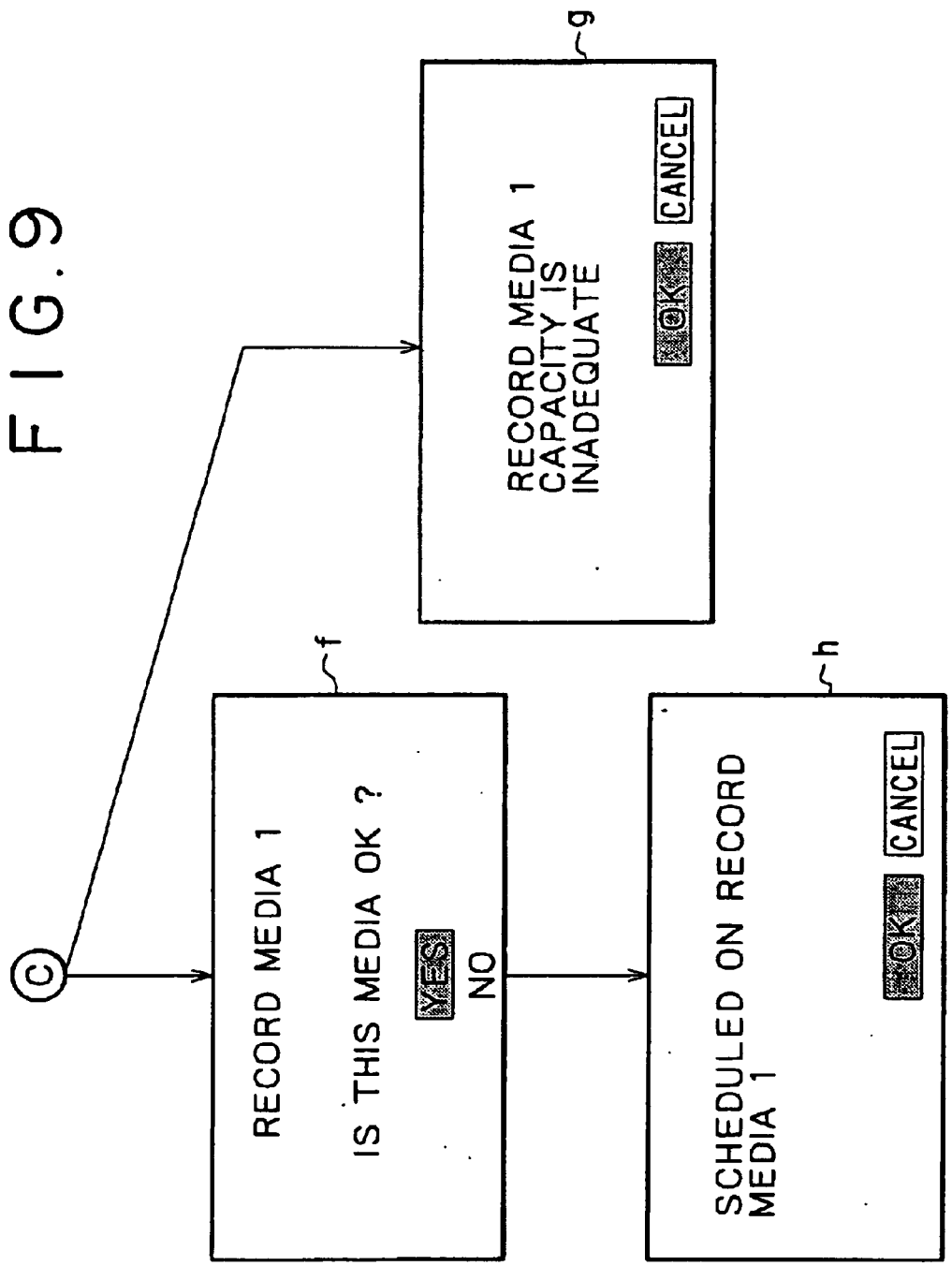

F I G. 10

```
RECORD MEDIA NO.: 2
RECORDING CAPACITY: 1GB
CATEGORY: NEWS
RECORDING ITEMS:
PROGRAM    RECORDING   RECORDING   DATA       CHANNEL
TITLE      TIME        DAY         QUANTITY
NEWS A     19 HOURS    FEB 20      300MB      BS5
NEWS B     30 MINUTES  FEB 21      150MB      10
NEWS C     1 HOUR      MAR 1       450MB      3
SELECT THE PROGRAM FOR PLAY OR DELETE
AND PRESS THE PLAY/DELETE KEY
```

F I G. 11

```
           RECORD MEDIA CATEGORY SETTING

RECORD MEDIA NO.              CATEGORY
           1                       MOVIE
           2                       NEWS
           3                       DRAMA

SELECT RECORD MEDIA WITH THE ↑↓ KEYS
   SELECT THE CATEGORY WITH THE ←→ KEYS
   AND PRESS OK
```

TRANSMIT DEVICE AND METHOD THEREOF, RECORD/PLAY DEVICE AND METHOD THEREOF AS WELL AS RECORDING SYSTEM AND MEDIA

BACKGROUND

1. Field of the Invention

The present invention relates to a transmit device and method, a record/play device and method, record system as well as a media and relates in particular to a transmit device and method, record/play device and method as well as a record system for transmitting the data quantity for a program from the digital broadcast, detecting the available capacity of the record media on the receive side, comparing both transmit data quantity and receive side available capacity and selecting the optimal record media for recording the data of that program.

2. Background of the Invention

Digital satellite broadcasting has recently become capable of providing programs on more than 100 channels. When the available channels become this numerous, selecting a desired channel becomes an inconvenient task for the viewer. Whereupon EPG (Electronic Program Guide) data is transmitted separately from the actual program information and the viewer can then select the desired channel based on the EPG.

In order for the viewer to be able to select the desired program from among the many available programs, the EPG data contains a table comprised of basic data such as broadcast station (channel) information, daily program broadcast information, program start time information and program length, etc. In addition to this information, information for the respective program attribute information descriptors such as the program title information, detailed program information (plot) is also sent. This transmitted information is acquired by the receiver and the EPG data corresponding to the data for a particular channel can be displayed on a monitor.

In contrast to analog broadcasts where the overall amount of data of the broadcast program is determined in proportion to the program broadcast time length in a fixed method, in digital broadcasts, the overall amount of program data is further determined by the proportion of transmission bit rate to the program broadcast time length.

Accordingly, in digital broadcasts it is difficult to know beforehand how much available record media will be required in order to receive the program. Consequently, selecting the optimal record media to record the program data is difficult.

In view of the above situation, this invention is intended to allow the program data quantity for the digital broadcast to be sent and the optimal record media to be selected by the receiver based on this program data quantity.

SUMMARY OF THE INVENTION

In consideration of the foregoing, it is therefore an object of the present invention to provide a transmit device which resolves the above mentioned problem. Another object of the present invention is to provide a transmit method which resolves the above mentioned problem. A further object of the present invention is to provide a transmission media which resolves the above mentioned problem. A still further object of the present invention is to provide a record device which resolves the above mentioned problem. A yet further object of the present invention is to provide a record method which resolves the above mentioned problem. Still another object of the present invention is to provide a record media which resolves the above mentioned problem. Yet another object of the present invention is to provide a recording system which resolves the above mentioned problem. Other and further objects, features and advantages of the invention will appear more fully from the subsequent description.

The object of the present invention is to provide a record device that includes EPG data generation means, supplemental means, and transmission means. The EPG data generation means is for generating EPG data. The supplemental means is for generating supplemental information including information indicating the program data quantity and add this information to the EPG data. The transmission means multiplexes the program data and the EPG data added with supplemental information and transmits this multiplexed information as a digital signal.

The object of the present invention is to provide a transmit method that contains a generation step, a supplement step and a transmit step. The generation step generates EPG data. The supplement step generates supplemental information indicating the program data quantity and adds this information to the EPG data. The transmit step multiplexes the program data and the EPG data to which the supplemental information was added and transmits this multiplexed information as a digital signal.

The object of the present invention is to provide a record device that contains receive means and control means. The receive means is for receiving the program data transmitted as a digital signal and receiving the EPG data to which supplemental information was added containing information indicating the program data quantity. The control means extracts the supplemental information from the EPG data and based on the supplemental information and the capacity of the record media, controls the selection of the record media for recording the program data.

The object of the present invention is to provide a record method that contains a receive step, an extraction step, and a selection step. The receive step receives the program data transmitted as a digital signal and receives the EPG data to which the supplemental information was added containing information indicating the program data quantity. The extraction step extracts the supplemental information from the EPG data. The selection step selects the record media for recording the program data based on the capacity of the record media The object of the present invention is to provide a recording system that contains a transmit device and a record device. The transmit device contains EPG data generation means, supplemental means and transmit means. The EPG data generation means generates the EPG data. The supplemental means generates supplemental information including information indicating the program data quantity and adds this supplemental information to the EPG data. The transmit means multiplexes the program data and the EPG data to which the supplemental information was added and transmits this multiplexed information as a digital signal. The record device contains receive means and control means. The receive means receives the program data and the EPG data. The control means extracts the supplemental information from the EPG data and controls the selection of the record media for recording the program data based on the supplemental information and the capacity of the record media.

BRIEF DESCRIPTION OF THE DRAWINGS

FIG. 5 is a drawing showing the remote controller 61 of FIG. 2.

FIG. 8 is a drawings displaying the flow of screen images for the record reserve process shown on the monitor 62.

FIG. 9 shows other screen images of the process flow continuing from FIG. 8.

FIG. 10 is a drawing showing sample library data.

FIG. 11 is a drawing showing typical record media category settings.

DETAILED DESCRIPTION OF THE PREFERRED EMBODIMENTS

Figure 1:
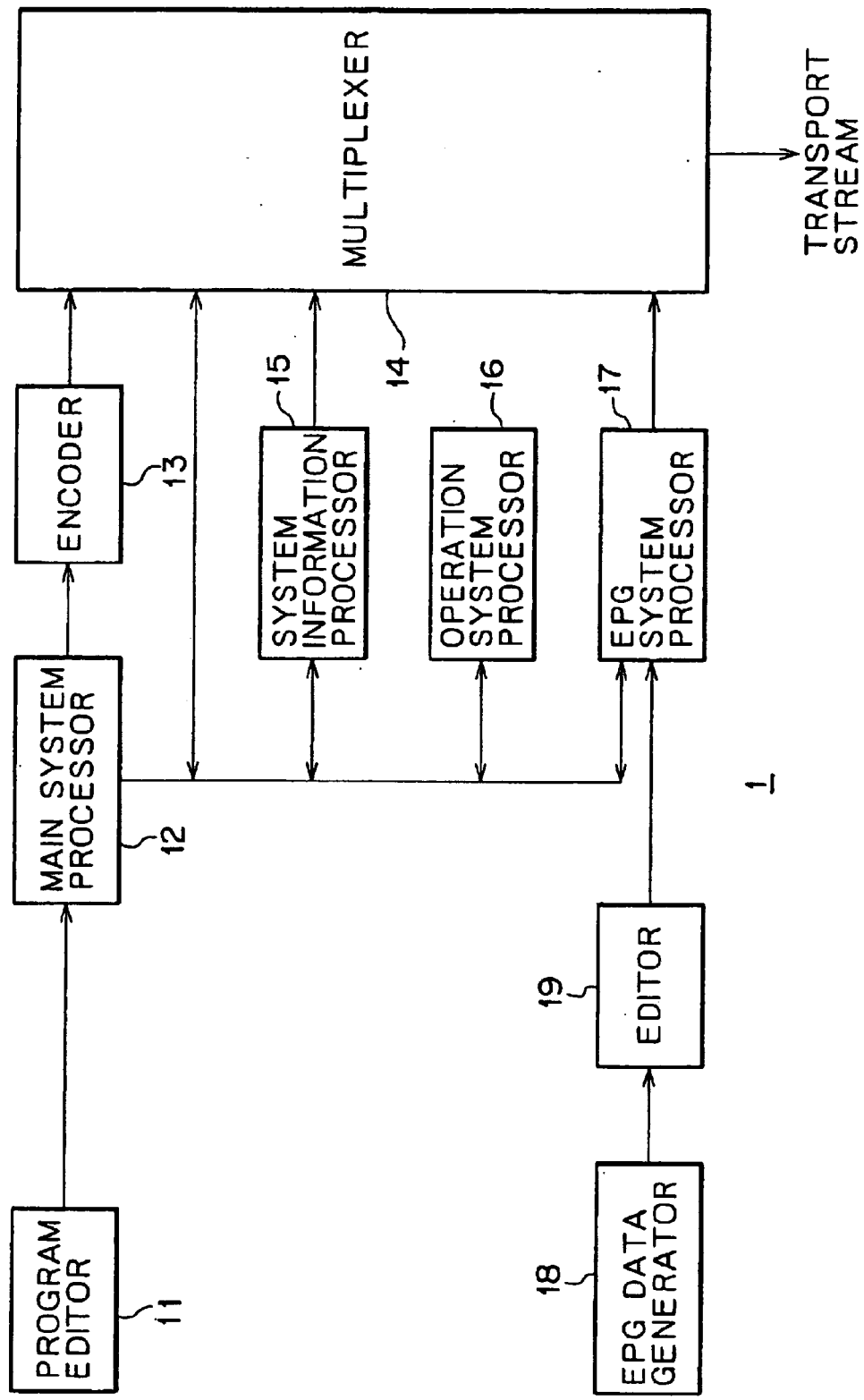
FIG. 1 is a block diagram showing the configuration of the transmit device adapted for this invention.

Hereafter, an embodiment of this invention is described while referring to the accompanying drawings. A block diagram showing the configuration of transmit device comprising the transmit/receive system of this invention is shown in FIG. 1. The program data to be broadcast, including audio data and video data is generated in a program editor 11. A main system processor 12 supplies the program data received from the program editor 11 to an encoder 13 and also generates and reference blocks and time information to a system information processor 15, an operation system processor 16, an EPG system processor 17 and a multiplexer 14, etc. The program data supplied from the program editor 11 by way of the main system processor 12 is encoded in a format such as MPEG format and output to the multiprocessor 14.

The system information processor 15 generates the system information and controls the multiplexing operation in the multiplexer 14. The operation system processor 16 processes the operator input signals from the keyboard and mouse (not shown in drawing) and sends an output to the main processor when necessary.

The EPG generator 18 generates the EPG data and outputs this data to an editor 19. The editor 19 adds data quantity information showing the data quantity of that program to the EPG data. The EPG system processor 17 synchronizes with the signal supplied from the main system processor 12, processes EPG data supplied from the editor 19 and outputs this data to the multiprocessor 14. The multiprocessor 14 synthesizes the EPG data supplied from the EPG system processor 17 with the program data supplied from the encoder 13 and outputs the synthesized data to a satellite (not shown in the drawing) as a transport stream.

Figure 2:
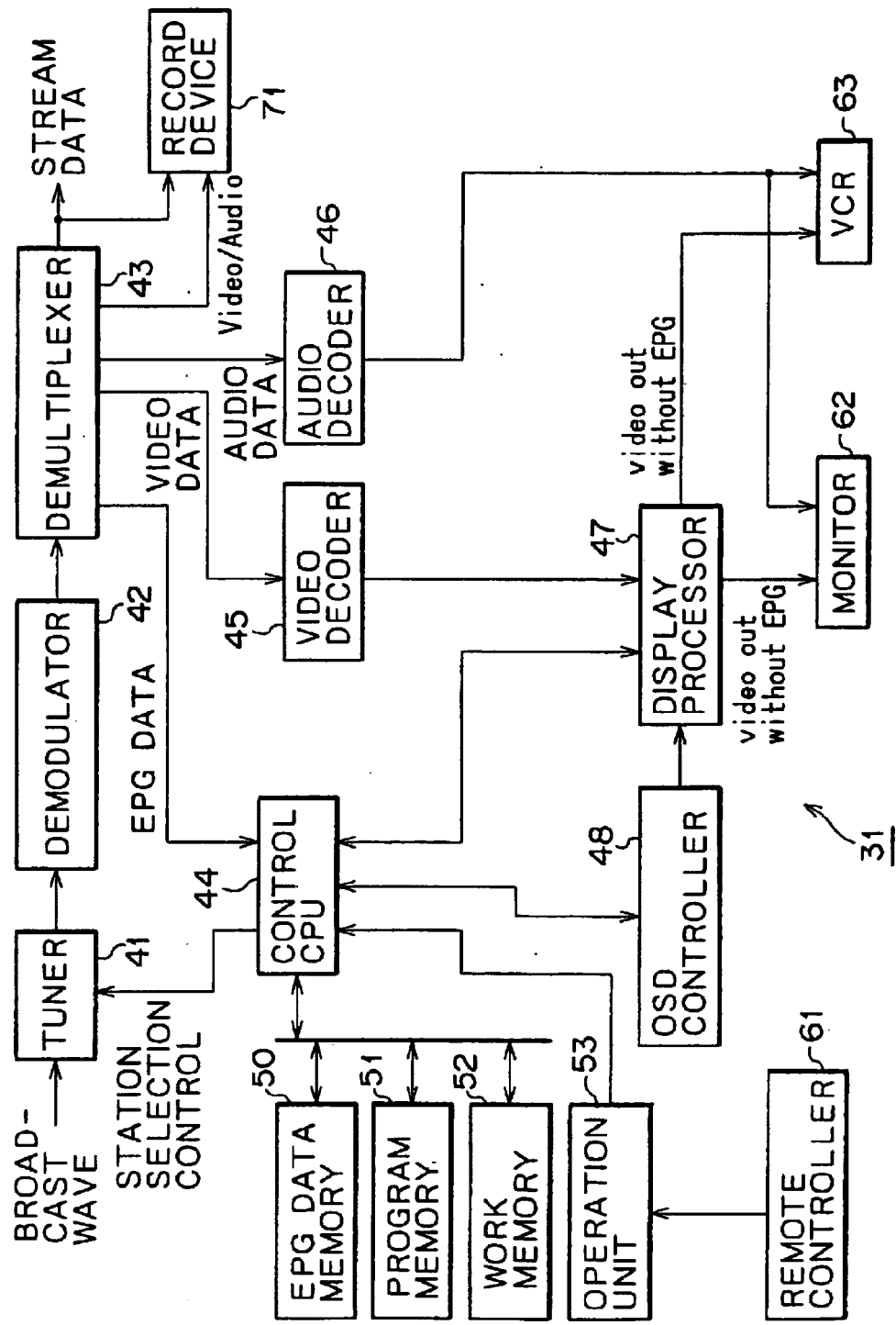
FIG. 2 is a block diagram showing the configuration of the receive device adapted for this invention.

FIG. 2 shows a sample configuration of the receive device for receiving the data transmitted by way of the satellite from a receiver 1 shown in FIG. 1. The receive device 31 receives by way of a tuner 41, the RF carrier transmitted by the satellite and outputs the received signal to a demodulator 42. This demodulator 42 demodulates the signal supplied from the tuner 41 and outputs the demodulated signal to a demultiplexer 43. The demultiplexer 43 besides extracting the audio and video data comprising the program data from the data input from the demodulator 42, also extracts the EPG data. The demultiplexer 43 respectively supplies the audio data to an audio decoder 46, the video data to a video decoder 45 and the EPG data to the control CPU 44. The demultiplexer 43 also supplies stream data containing video data, audio data and EPG data, along with identification data for discriminating the audio data and the video data to a record device 71 which is connected to the demultiplexer 43.

An audio decoder 46 decodes the audio data that was input and outputs the decoded audio for instance to a VCR (video cassette recorder) 63 or a monitor 62 connected to the receive device 31. A video decoder 45 decodes the video data and output the decoded video to a display processor 47.

An OSD (On Screen Display) controller 48 is controlled by means of the control CPU 44, OSD (On Screen Display) data is created to make redundant video data and output to the display processor 47. Operating under the control of the display processor 47, the video data supplied by the video decoder 45 is synthesized as needed with the OSD data supplied from the OSD controller 48 and output to the monitor 62.

An EPG data memory 50 stores in necessary amounts, the EPG data the control CPU 44 has received from the demultiplexer 43. A program memory 51 stores the programs required to run the various types of processing of the control CPU 44. A work memory 52 stores as needed the programs and data required for the control CPU 44 to run the various processes. An operation unit 53 receives signals from the buttons and switches (not shown in drawing) installed on the chassis of the receive unit 31 or input by infrared signal from the remote controllers 61 (hereafter remote control) and outputs these detected signals to the control CPU 44.

A record device 71 records the stream data from the demultiplexer 43.

Figure 3:
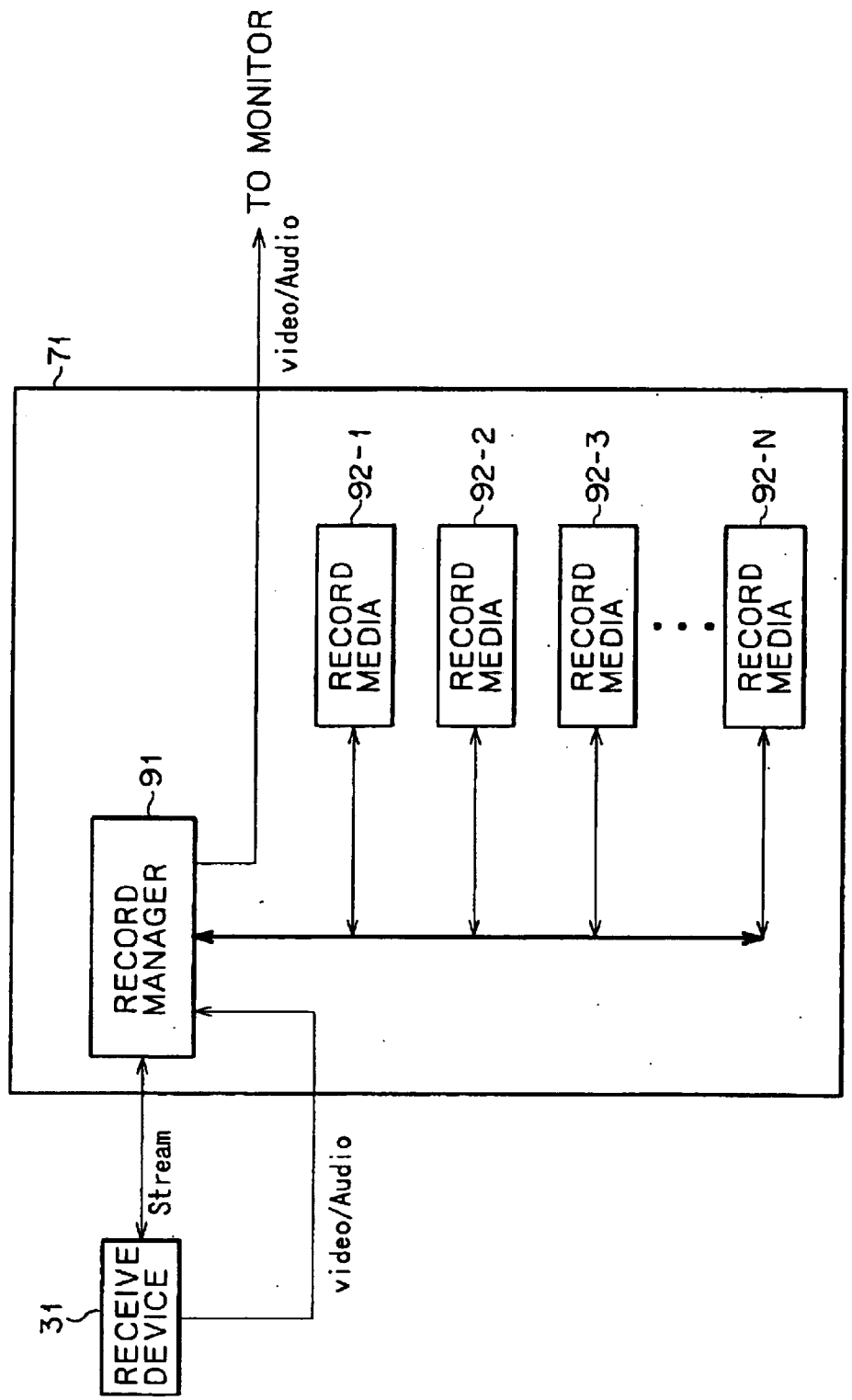
FIG. 3 is a block diagram showing the configuration of the record/play device adapted for this invention.
Figure 4:
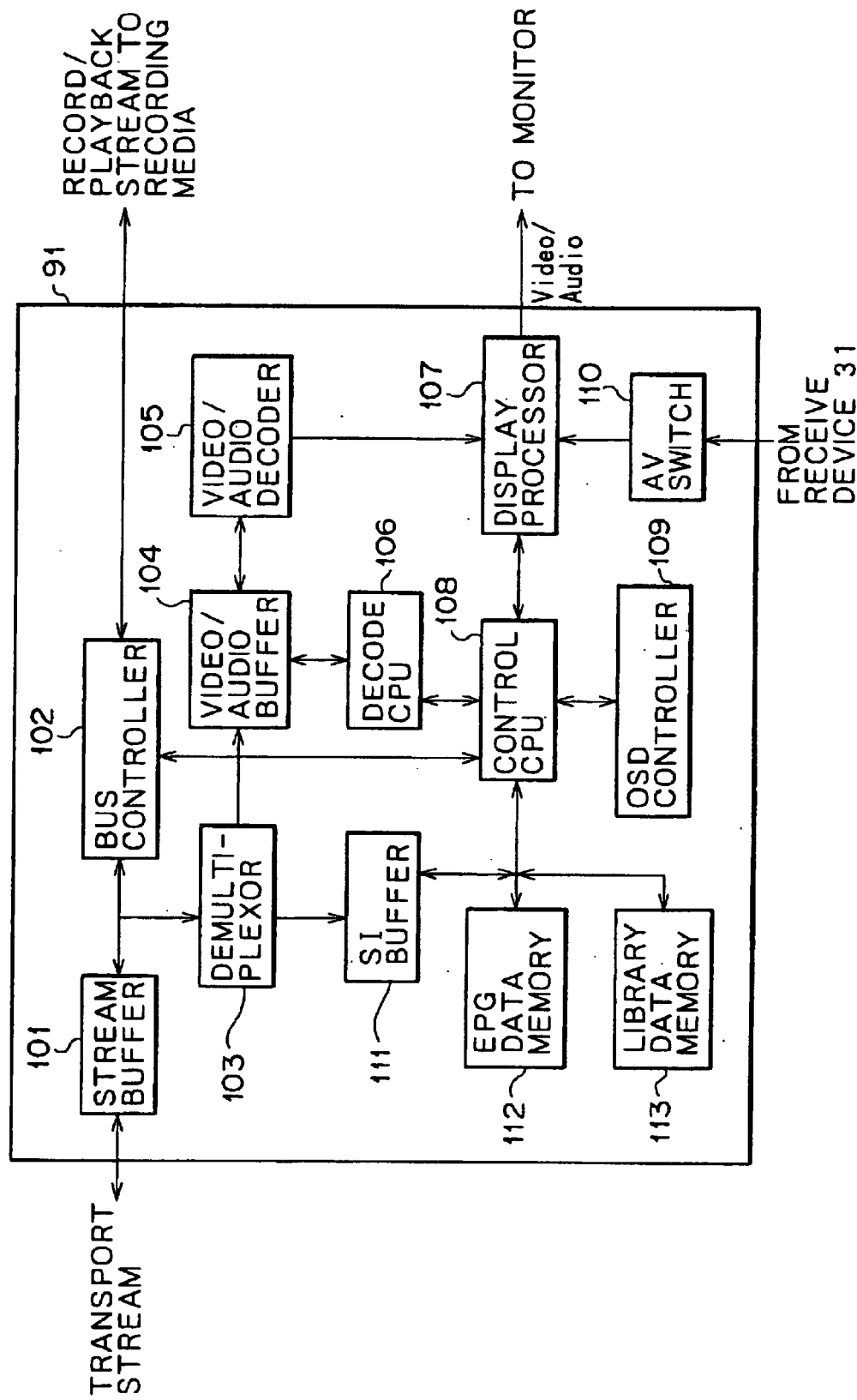
FIG. 4 is a block diagram showing the configuration of the record controller 91 of FIG. 3.

The configuration of the record device 71 is shown in FIG. 3. When a record manager 91 receives the stream data, and identification data for the audio data and stream data, the record manager 91 demultiplexes (or isolates) the video data, audio data and EPG data from the stream data and also detects the data quantity information from the EPG data. The record manager 91 monitors the capacity of the record media 92-1 through 92-N and library data containing this quantity information is stored internally in a memory 113 (FIG. 4). The record manager 91 selects the most ideal record media for recording from among the record media 92-1 through 92-n based on the library data and the data quantity information and the results of the selection are externally output as needed to a monitor 62. The record manager 91 then records the video data and audio data in the selected record media from among the record media 92-1 through 92-n according to the inputs entered by the user based on the monitor display.

A block diagram of the manager 91 is shown in FIG. 4. A stream buffer 101 receives the transport stream supplied from the demultiplexer 43 of the receive device 31, temporarily stores the transport stream and then outputs it to the bus controller 102 and the demultiplexer 103. The bus controller 102, besides controlling the transmission of the various signal on the buses to which it has made connection, also supplies the data input from the stream buffer 101 to the specified record media from among the record media 92-1 through 92-n as well as to the controller CPU 108. The demultiplexer 103, besides extracting the audio data and the video data from the data input from the stream buffer 101, also extracts the EPG data. The audio data and video data are supplied to a video/audio buffer 104 and the EPG data to the SI (Service Information) buffer 111. After the video/audio buffer 104 under the control of the decode CPU 106 stores the video and audio data that was input, the video and audio data is supplied to the video/audio decoder 105. The video/audio decoder 105 decodes the video data that was supplied and supplies the decoded data to a display processor 107.

Under the control of the control CPU 108, the display processor 107 synthesizes the OSD data supplied from an OSD controller 109 with the video data that was supplied and outputs the data to an external monitor 62 according to the signal supplied from the receive device 31 by way of the AV switch 110.

After the SI buffer 111 temporarily stores the EPG data supplied from the demultiplexer 103, the SI buffer 111 then outputs the EPG data to the control CPU 108. An EPG data memory 112 stores the EPG data the control CPU 108 has received from the SI buffer 111. A library data memory 113 stores required information by means of the record media 92-1 through 92-n managed by the control CPU 108.

FIG. 5 is a drawing showing the functions of a remote control 61. The remote controller 61 contains cursor keys 131-1 to 131-4 for moving the cursor keys up and down and left and right on the monitor screen, a button 132 for displaying the EPG on the monitor screen, an OK button 133 for making the respective settings, a button 134 for scheduling recording of the program, a button 135 for playing back the recorded data, a button 136 for deleting the recorded data, a button 137 for making the program category settings related later, and a button 138 to perform the library display related later. When the user clicks one of these buttons, processing corresponding to that button are performed in the record device 71.

Figure 6:
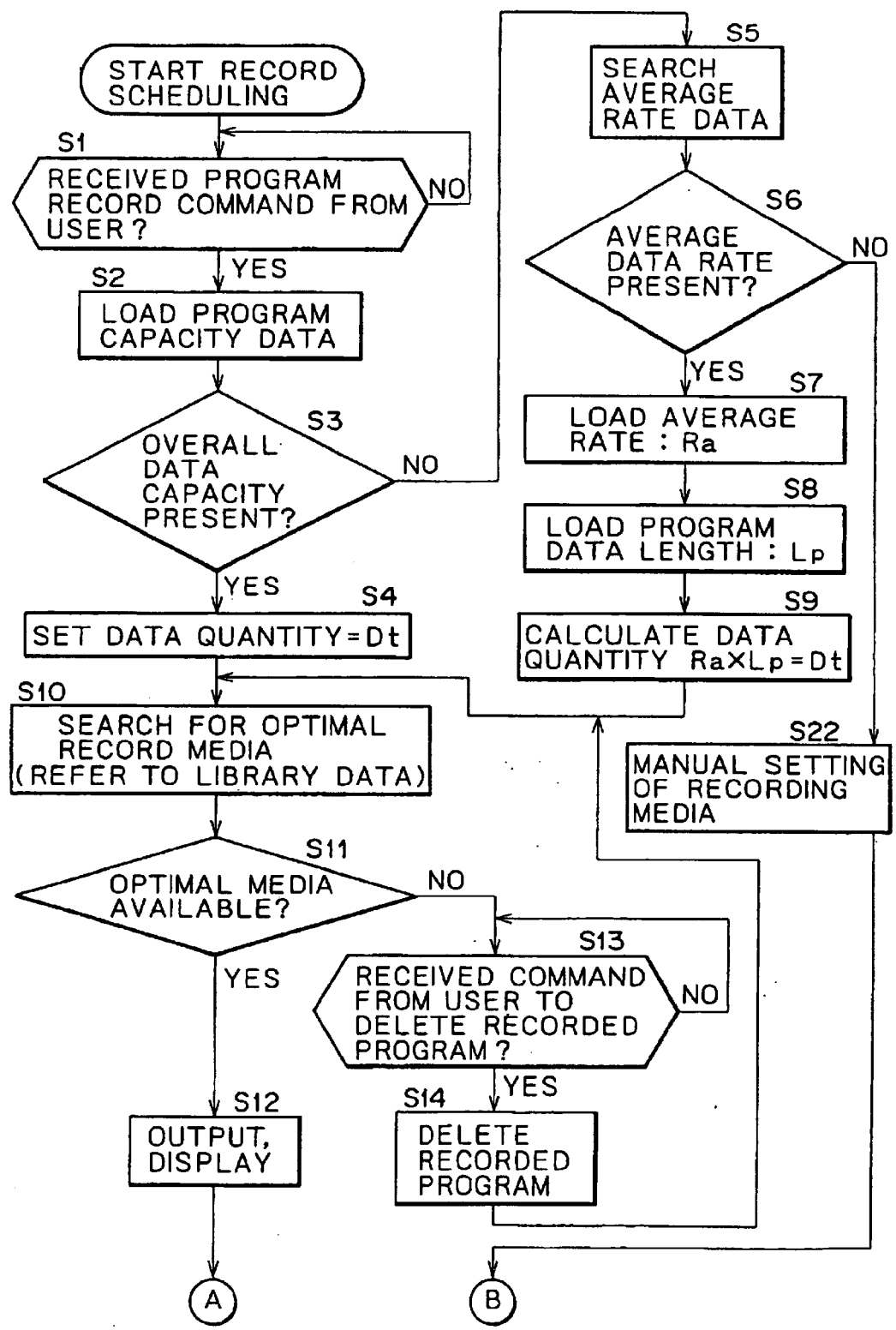
FIG. 6 is a flowchart describing the record reserve process for the control CPU 108.
Figure 7:
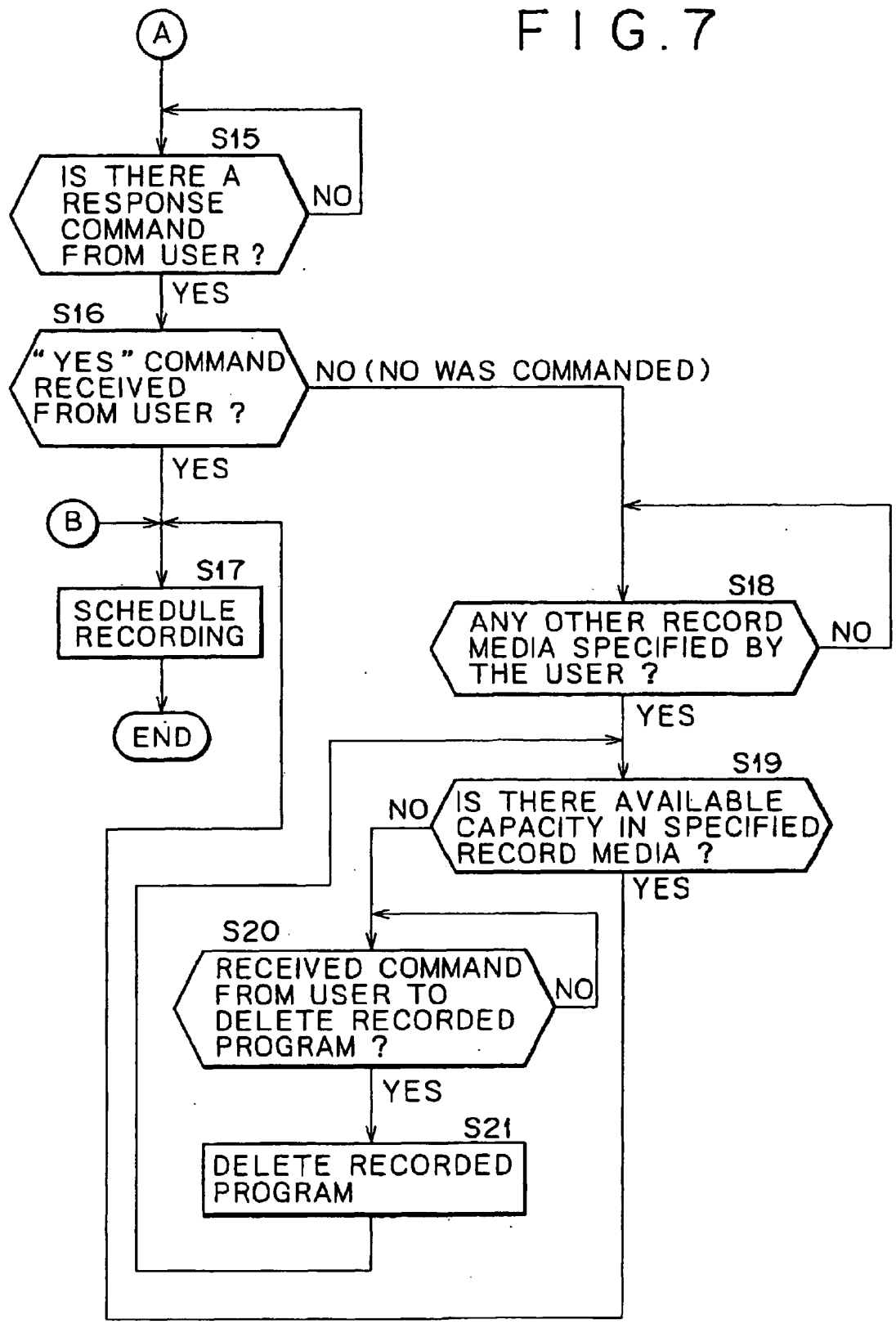
FIG. 7 is a flowchart continuing from FIG. 6.

The process for scheduling the recording of program data by means of the control CPU 108 in the record manager 91 of the record device 71 is next explained while referring to the flowcharts in FIG. 6 and FIG. 7. This processing can also be executed on the OSD controller 109. The record media 1–3 listed hereafter, indicate record media numbers set to correspond to the record media 92-1 through 92-N. First, in step S1, the control CPU 108 is in standby until the "Record Schedule" button 134 on the remote control 61 is clicked by the user. When the "Record Schedule" button 134 is clicked by the user, the control CPU 108 then receives the record program command by way of the AV switch 110, and the processing proceeds to step S2. In step S2, the control CPU 108 loads the data quantity for the program specified for recording from the EPG data memory 112. Actually the exact same operation and effect can be obtained if the user directly operates the button on an operating unit 53 having the same buttons as the remote control 61 and this approach is explained next using the remote control 61 as the operating medium.

In step S3, the control CPU 108 decides if data expressing the overall data capacity of the program (hereafter called overall data capacity) is present or not inside the program data that was loaded. If determined that the overall data capacity is present, the process proceeds to step S4 where the control CPU 108 sets this overall data capacity as data Dt for the program specified for recording in step S1.

However, if for instance the program is a live broadcast, then the EPG data generator 18 of the transmit device 1 cannot beforehand accurately determine a fixed quantity representing the overall data capacity of the program to transmit. In such a case, the EPG data generator 18 outputs an average bit rate to the encoder 13 during encoding, instead of the overall data capacity of the program and supplies this average bit rate to the control CPU 108 by way of the receive device 31 from the multiplexer 14 via satellite, the stream buffer 101 and the bus controller 102. Accordingly, when determined in step S4 that an overall data capacity is not present inside the data of the program specified for recording, the process proceeds to step S5 where the control CPU 108 detects the average bit rate data for the program specified for recording in step S1 and in step S6 decides whether or not average bit rate data is present.

When determined in step S6 that average bit rate data is present, the process proceeds to step S7, the control CPU 108 loads this average bit rate data Ra from the EPG data that was transmitted and further, in step S8, loads the data length Lp for the program specified for recording in step S1. Still further, in step S9, calculates the sum of the data length Lp and this average bit rate data Ra and sets the results of this calculation as the program data quantity Dt.

After completion of steps S4 and S9, the control CPU 108 detects in step S10, the respective remaining storage capacity of the record media 92-1 through 92-N from the library data stored in the library data memory 113. The control CPU 108 then determines in step S11 whether or not an optimal record media is present. Restated, the control CPU 108 determines whether or not the maximum capacity remaining in the record media 92-1 through 92-N is a sufficient capacity to record the program data of the program specified for recording.

In step S11, upon determining that an optimal record media is present, the process proceeds to step S12 where the control CPU 108 controls the OSD controller 109 and the information of this optical record media (in this case, record media 2) is generated, and output to the monitor 62. The monitor 62 displays in image such as shown on the screen b of FIG. 8, in the display space provided in the lower part of screen b of FIG. 8 (EPG is shown on the left side).

When decided in step S11 that an optimal record media is not present, the process proceeds to step S13 and the OSD controller 109 under the control of the control CPU 108, generates information indicating that an optimal record media is not present and outputs this information to the monitor 62. The control CPU 108 displays a message such as in screen c of FIG. 8, on the display space provided on the lower part of the screen a of FIG. 8 (EPG is displayed on left side) on the monitor 62 and stands by for a command from the user ordering deletion of the recorded program.

When a display such as on screen c of FIG. 8 appears, the user clicks the cursor key 131-1 or the cursor key 131-4 on the remote control 61 and moves the cursor left and right on the screen above "OK" or "CANCEL" and clears the screen by clicking the "OK" button 133. The user next clicks the "Library display" button 138 on the remote control 61 and transmits the command signal to the control CPU 108 by way of the AV switch 110. The control CPU 108 controls the OSD controller 109 according to the command from the user and displays a library data image as shown in FIG. 10. At this point, the user clicks the cursor key 131-1 or the cursor key 132-2 in order to assure recording space for the program data that is to be recorded by moving the cursor on the screen to a program that can be deleted and clicking the "Delete" key button 136. By deleting the selected program data in this way, a command signal can be sent to the control CPU 108 by way of the AV switch 110.

In other words, the user selects program data that can be deleted in the available record program data consisting of program titles, record time, record day, data quantity and channel as shown in FIG. 10. Restated, the user moves the cursor on the screen to a point with program data that can be deleted (news A in the current case) by clicking the cursor key 131-1 or the cursor key 131-2 and then clicking the "Delete" button 136 at that position.

Upon receiving a command from the user as in step S13 to delete a record program, the process proceeds to step S14 and the control CPU 108 deletes program data specified for deletion by the user from among the program data stored in the library data memory 113. As a result, in the library data (corresponding to program data stored in the library data memory 113), the available storage capacity will increase by 300 MB which is equal to the data quantity of the news A. In other words, an "Available recording capacity" of 1 GB (in this case, record media 2) corresponding to the "Record Media No." is displayed. However, in the "Data quantity" for the record programs displayed on the lower part of the same figure, the capacities were respectively 300 MB, 150 MB and 450 MB so that the original available capacity increased to 400 MB (1 GB−(300 MB+150 MB+450 MB)= 100 MB) after deleting the data described above. Thus for example, when a data quantity Dt was set as 200 MB in step S4, this deletion will allow recording space to be obtained for new program data. Further, The control CPU 108 next returns to step S10 and performs the same processing repeatedly until (Yes is decided in step S11) recording space is obtained for the next program data that the user currently wants to record. When the decision in step S11 is a YES, the process proceeds to step S12 and the subsequent processing is performed.

After completion of the processing in step S12, the operation proceeds to step S15 of the flowchart of FIG. 7 continuing from the flowchart of FIG. 6, and the control CPU 108 stands by until a reply from the user is received in response to the screen image as shown on screen b of FIG. 8. The user here moves the cursor up or down to the "YES" or the "NO" position on an image display as shown on screen b of FIG. 8 by clicking the cursor key 131-1 or 131-2 and then clicking the "OK" button 133 for one of these positions. When the user has made a reply, the process proceeds to step S16 and the control CPU 108 decides from the "YES" or "NO" command received on the screen in response to the b screen of FIG. 8.

The control CPU 108 proceeds to step S17 when a "YES" was received from the user in step S16, and the control CPU 108 then executes the processing to schedule (or reserve) the program data as specified in step S1 per record media 2. The control CPU 108 next displays an image such as on the screen d of FIG. 8 on the monitor 62 by controlling the OSD controller 109. The user clicks the cursor keys 131-3 or the cursor key 131-4 of the remote control 61 to move the cursor left or right to the "OK" or the "CANCEL" button in response to the display message shown on screen d of FIG. 8, and clicks the "OK" button which clears the screen. By this action, the user thus confirms the end of the data scheduling of the program specified in step S1 in FIG. 6.

When the control CPU 108 determines that a "NO" command was received from the user, the process proceeds to step S18. Here, the control CPU 108 controls the OSD controller 109 to display an image as shown in screen e of FIG. 8 and stands by for a command from among the record media 92-1 through 92-N from the user according to the screen display. The user then moves the cursor to another record media number (in this case record media 1) from among the record media 92-1 through 92-N of the program data specified in step S1 of FIG. 6 whose recording is desired, by clicking the cursor keys 131-1 or 131-2 on an image such as shown in screen e of FIG. 8, and the user then clicks the "OK" button 133 at that position.

When the user specifies another record media from among the record media 92-1 through 92-N in step S18, the process then proceeds to step S19 and the control CPU 108 determines whether or not there is available capacity in the record media (in this case, record media 1) re-specified by the user. When determined that there is available capacity in a record media specified again by the user, the process proceeds to step S17 and the control CPU 108 schedules the program data specified in step S1 of FIG. 6 for the record media (in this case, record media 1) specified in step S18.

More specifically, the OSD controller 109 under the control of the control CPU108 displays an image such as shown on the screen f of FIG. 9. The user, in response to the screen f of FIG. 9, moves the cursor up or down to the "YES" or the "NO" position on an image display as shown on screen f of FIG. 9 by clicking the cursor key 131-1 or 131-2 and then clicking the "OK" button 133 for one of these positions. If the user selects "NO", then the control CPU 108 again displays an image shown as previously related for screen e of FIG. 8 and from hereon, the same image is repeatedly displayed.

When the user selects a "YES" from screen f in FIG. 9, the OSD controller 109 under the control of the control CPU 108 displays an image such as shown on screen h of FIG. 9. The user in response to the image display on screen h of FIG. 9, clicks the cursor key 131-3 or the cursor key 131-4 of the remote control 61 to move the cursor right or left to the "OK" or the "CANCEL" on the screen and then clicks the OK button 133 clearing the screen.

When the control CPU 108 determines in step S19 that there is not sufficient available capacity in the record media re-specified in step S18, the process proceeds to step S20 and the OSD controller 109 functions to display an image such as shown on screen g of FIG. 9 on the monitor 62. The user in response to the image display on screen g of FIG. 9, clicks the cursor key 131-3 or the cursor key 131-4 of the remote control 61 to move the cursor right or left to the "OK" or the "CANCEL" on the screen and then clicks the OK button 133 clearing the screen. Afterwards, the user just the same as for processing in response to step S13 of FIG. 6, clicks the "Library display" button 138 to display library data for the record media (in this case, record media 1) specified in step S18.

Next, in order to obtain recording space on which to record the desired program data, the user clicks the cursor key 131-1 or cursor key 131-2 and further moving the cursor on to the program to be erased, the user then clicks the "Delete" button 136. When the "Delete" button 136 is clicked, a command signal is transmitted by way of the AV switch 110, to the control CPU 108 to select deletion of the program data.

When the control CPU 108 receives this command from the user, the same-processing as in step S14 of FIG. 6 is performed on the re-specified record media of step S18. Afterwards, the control CPU 108 returns to step S19, and repeatedly performs the same processing until the recording space for the program data specified for recording in step S1 of FIG. 6 is finally obtained (determined as a YES in step S19) inside the re-specified record media in step S18. The control CPU 108 next proceeds to step S17 when a YES is determined in step S19, and performs the subsequent processing.

When a NO outcome is determined in step S19, the control CPU 108 proceeds to step S20. If the received command from the user indicates deletion of the recorded program at step S20, then the recorded program is deleted at step S21.

When determined in step S6 of FIG. 6 that there is no average bit rate, the process proceeds to step S22 and the control CPU 108 schedules recording in response to manual operation by the user on the optimal media from among the record media 92-1 through 92-N. In other words, the user checks the record media 92-1 through 92-N one by one for available capacity and designates the optimal record media. After completion of the processing of step S22, the process proceeds to step S17 of FIG. 7 and the control CPU 108 performs the subsequent processing.

After completion of the processing of step S17 in FIG. 7, the control CPU 108 terminates all processing.

However, record program data quantity setting is performed in addition to making settings for the record program category transmitted by the EPG from the transmit side to the record media 92-1 through 92-N and based on these category settings, the control CPU 108 is further able select an ideal record media. The embodiment is explained as follows. The transmit/receive system of this embodiment contains a transmit device 1, a receive device 31, a record device 71, a record manager 91 as well as a remote control 61. These components were previously described so an explanation is omitted here.

The operation of the record manager 91 inside the record device 71 is explained next. Library data such as shown in FIG. 10 stored in the library data memory 113 of the record device 71, contains the respective items "Record media No." and "Category" respectively for the record media 92-1 through 92-N. The user clicks the "Library display" button 138 of the remote control 61 to display these "Record media No." and "Category" items on the screen as shown in FIG. 11 and then operates the cursor keys 131-1 through 131-4 to move the cursor to the desired setting position and then clicks the "OK" button 133 to transmit a command for a category setting. In response to this user operation, the "Record media No." and "Category" items are both linked and registered in the library data memory 113 under the control of the control CPU 108 of the record device 71.

Figure 12:
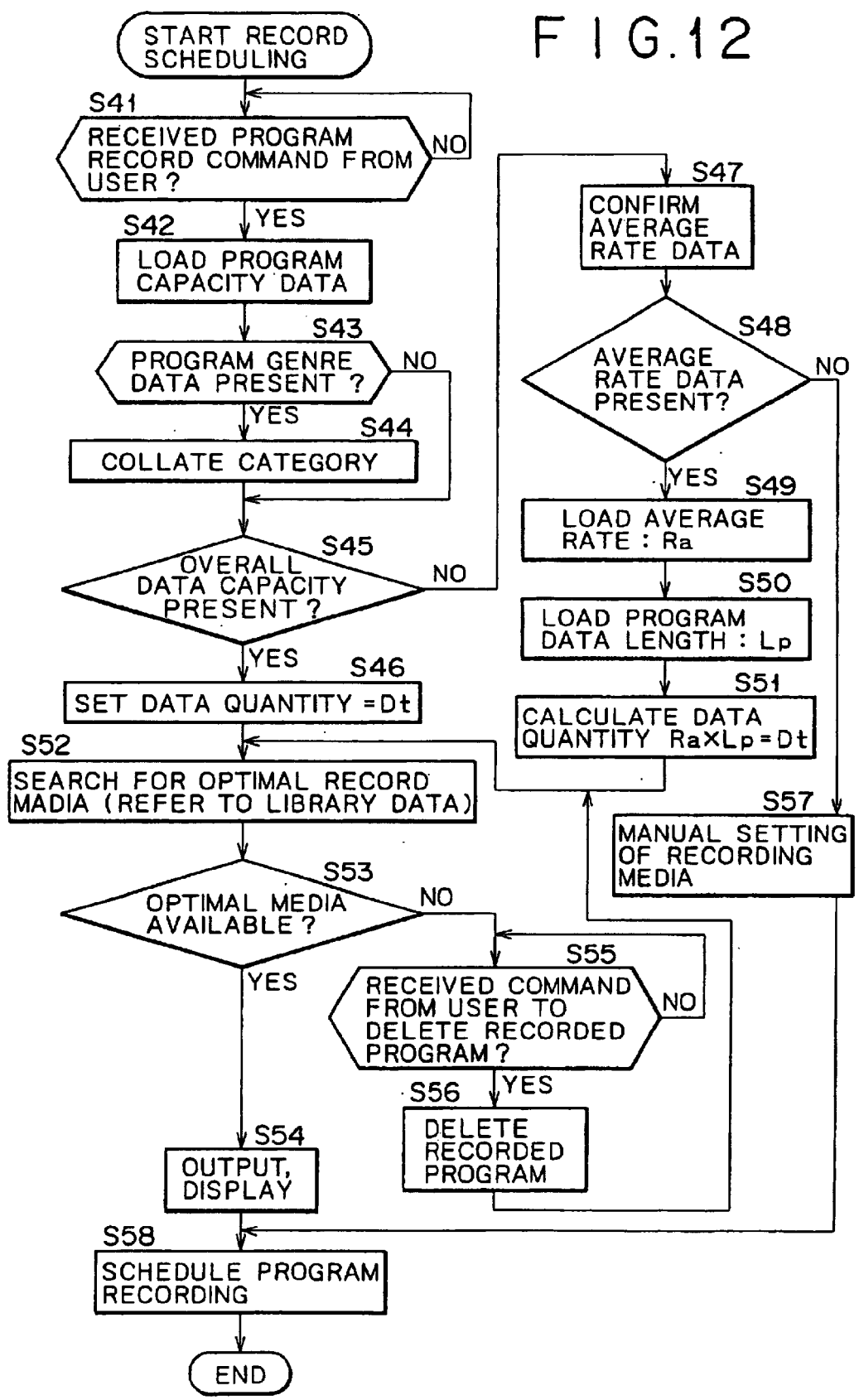
FIG. 12 is a flowchart describing another record reserve process for the control CPU 108

The record scheduling process for program data by means of the control CPU 108 of the record manager 91 of record device 71 is next explained while referring to the flowchart of FIG. 12 (This processing can also be executed on the OSD controller 109). The control CPU 108 performs processing identical to that of steps S1 and S2 in FIG. 6. Afterwards, in step S43 the control CPU 108 loads the EPG data from the program data specified in step S41 and decides whether or not category data is present. When the control CPU 108 decides that category data is present, the process proceeds to step S44 and the control CPU 108 matches this category data with the record media number of the record media.

The program specified in step S41 is scheduled for recording (dubbing) in the subsequently related step S58 so that this specified program is thus recorded in the record media 92-1 through 92-N corresponding to that category during recording. The category data loaded (read out) in step S42 may be an item other than that stored in the library data memory 113, but that possibility is disregarded in this flowchart. If indeed an item other than that stored in the library data memory 113 is read out (loaded) then the processing of the flowcharts of FIG. 6 and FIG. 7 in the previous embodiment is performed and the user may for instance make manual settings in step S18 of FIG. 7 while referring to screen e of FIG. 8.

In steps S45 through S51, the control CPU 108 executes substantially the same processing as in steps S3 through S9 in FIG. 6, for the program data that was specified in step S41. In step S52, the control CPU 108 searches according to the matching category of step S44, the record media 92-1 through 92-N of the library data stored in the library data memory 113 for remaining recording capacity for record media specified for the program designated in step S41. Based on this remaining recording capacity, the control CPU 108 determines in step S53 whether or not an optimal record media is present for the program category from among the record media 92-1 through 92-N.

In other words, when the record media specified in step S44 from among record media 92-1 through 92-N has sufficient capacity to record the program specified in step S41, the control CPU 108 determines that the media specified in step S44 is the optimal record media. However, when the media specified in step S44 does not have sufficient available record capacity, then the control CPU 108 determines that an optimal record media is not present.

Figure 13:
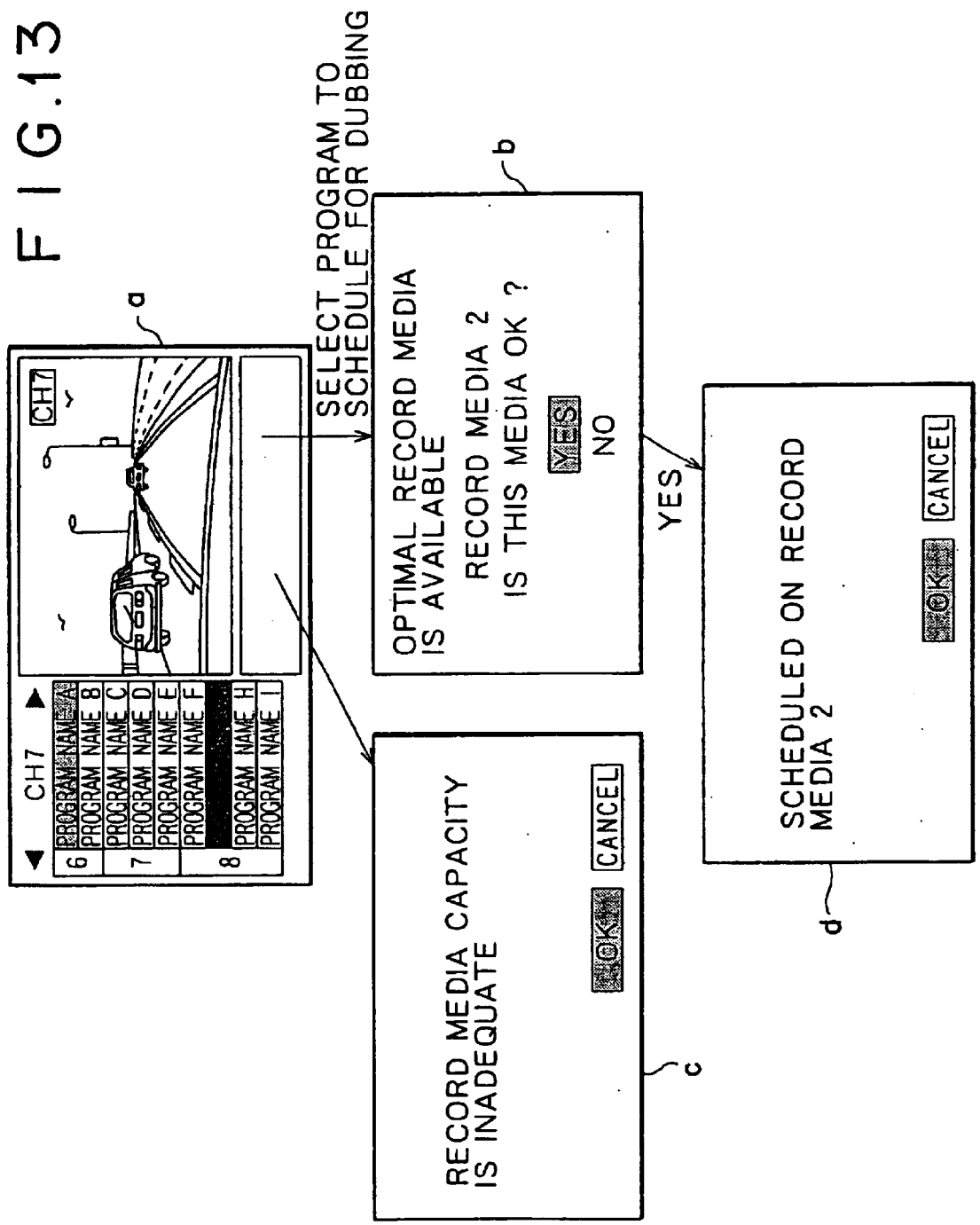
FIG. 13 are images of another display flow of record reserve images displayed on the monitor 62.

In step S53, when the control CPU 108 determines that an optimal record media is present, the process proceeds to step S54. Here, under control of the OSD controller 109, information is generated to show an optimal record media (in this case, record media 2) is present, and output to the monitor 62. The control CPU 108 causes an image as shown in screen b of FIG. 13 to be displayed in a display space provided in the lower part of screen a (The EPG is displayed on the left.) of FIG. 13.

In step S53, when the control CPU 108 determines that an optimal record media is not present, the operation proceeds to step S55 and under control of the OSD controller 109, information is generated indicating that an optimal record media is not present and output to the monitor 62. The control CPU 108 causes an image as shown in screen c of FIG. 13 to be displayed in a display space provided in the lower part of screen a (The EPG is displayed on the left.) of FIG. 13. The control CPU 108 then stands by just the same as in step S13 of FIG. 6, until a command is received to delete the recorded program.

In step S55, upon receiving a command from a user to delete a recorded program, the control CPU 108 deletes program data specified for deletion from among program data stored in the library data memory 13, at step S56, just as performed in step S14 of FIG. 6. As a result, in the library data (corresponding to program data stored in the library data memory 113), the available storage capacity will increase by 300MB which is equal to the data quantity of the news A. In other words, an "Available recording capacity" of 1 GB (in this case, record media 2) corresponding to the "Record Media No." is displayed. However, in the "Data quantity" for each recorded program displayed in the lower part of the same figure, the capacities were respectively 300 MB, 150 MB and 450 MB so that the original available capacity increased to 400 MB (1 GB−(300 MB+150 MB+450 MB)=100 MB) after deleting the data as described above. Thus for example, when a data quantity Dt was set as 200 MB in step S46, the above described deletion will therefore allow recording space to be obtained for new program data. Further, the control CPU 108 next returns to step S52 and performs the same processing repeatedly until (Yes is decided in step S53) recording space is obtained for the next program data the user currently wants to record.

In step S48 when the control CPU 108 determines that average bit rate data is not present, the process proceeds to step S57 and the same processing as in step 22 of FIG. 6 is executed.

After completion of the processing in steps S54 and S57, the process proceeds to step S58 and the control CPU 108 schedules recording (dubbing) of the program data specified in step S41 of FIG. 12, onto the record media corresponding After completion of the processing of step S58, the control CPU 108 terminates all processing.

Figure 14:
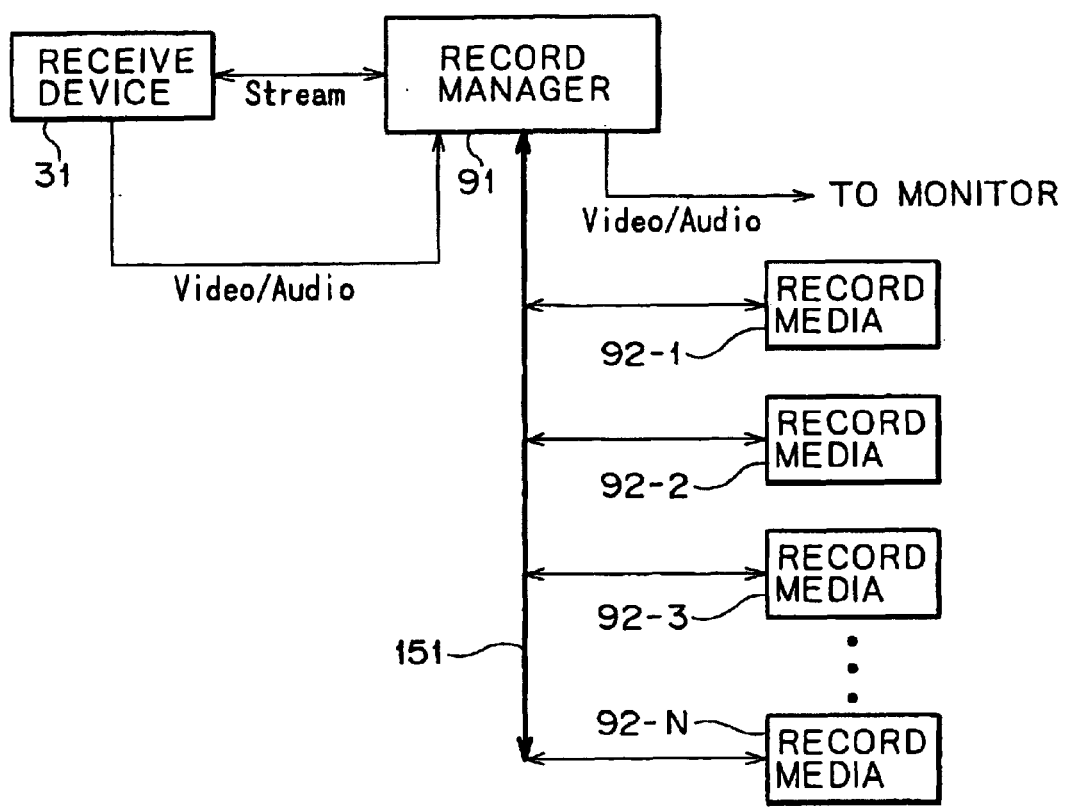
FIG. 14 is a block diagram showing another configuration of the record/play device adapted for this invention.

Both of the two embodiments showed the record manager 91 connected to the respective record media by means of an internal bus, however this invention may also use an arrangement such as shown in FIG. 14 in which the record manager 91 connects to the respective record media by means of an IEEE1394 format bus 151 utilized as an external bus. In FIG. 14, except for the IEEE1394 format bus 151, the structure is identical to FIG. 3 so an explanation is omitted here.

In this invention, the media supplied to the user having the computer program for executing the above described processing, besides information recording media such as CD-ROM or magnetic disks may also be a transmission media operating by means of a network such the Internet or digital satellite, etc.

What is claimed is:

1. A recording device comprising:
   receive means to receive Electronic Program Guide (EPG) data added with supplemental information containing information indicating the data quantity of a program, and to receive program data transmitted as a digital signal; and
   control means to extract said supplemental information from said EPG data,
   wherein said receive means receives EPG data added with average bit rate data as information indicating the data quantity of said program, and said control means calculates the data quantity of said program from said average bit rate data, and controls selection of a recording media to record said program data based on the data quantity of said program and the capacity of said recording media.

2. A recording device as claimed in claim 1, wherein said recording media is comprised of one unit.

3. A recording device as claimed in claim 1, wherein said recording device is connected by a bus and external recording media.

4. A recording device as claimed in claim 3, wherein said bus is an IEEE1394 configuration bus.

5. A recording device comprising:
   receive means for receiving EPG data added with supplemental information containing information indicating the category of a program, and to receive program data transmitted as a digital signal;
   extraction means for extracting said category of the program from said EPG data; and
   selection means for selecting a recording media to record said program data based on said category of the program.

6. A recording device as claimed in claim 5, wherein said recording media is a comprised of one unit.

7. A recording device as claimed in claim 5, wherein said recording device is connected by way of a bus and external recording media.

8. A recording device as claimed in claim 7, wherein said bus is an IEEE1394 configuration bus.

9. A recording method comprising:
   receiving EPG data added with supplemental information containing information indicating the data quantity of a program, and receiving program data transmitted as a digital signal, wherein said supplemental information includes average bit rate data;
   extracting said supplemental information from said EPG data;
   calculating the data quantity of said program from said average bit rate data; and
   selecting a recording media on which to record said program data based on the data quantity of said program and on the capacity of the recording media.

10. A recording method comprising:
    receiving EPG data added with supplemental information containing information indicating the category of a program, and receiving program data transmitted as a digital signal;
    extracting said category of the program from said EPG data; and
    selecting a recording media on which to record said program data based on said category of the program.

11. A recording method as claimed in claim 10, wherein said supplemental information further includes category information set for said recording media.

12. A media for providing a program, said program including executable instructions comprising:
    receiving EPG data added with supplemental information containing information indicating the data quantity of said program, and receiving program data transmitted as a digital signal, wherein said supplemental information includes average bit rate data;
    extracting said supplemental information from said EPG data; and
    calculating the data quantity of said program from said average bit rate data; and
    selecting a recording media on which to record said program data based on the data quantity of said program and on the capacity of the recording media.

13. A media for providing a program, said program including executable instructions comprising:
    receiving EPG data added with supplemental information containing information indicating the category of said program, and receiving program data transmitted as a digital signal;
    extracting the category of said program from said EPG data; and
    selecting a recording media on which to record said program data based on the category of said program.

14. A recording system comprising
    generating means for generating EPG data;
    supplementing means to for generating supplemental information containing information indicating the category of the program and adding this supplemental information to said EPG data;
    transmit means for multiplexing the program data with the EPG data added with said supplemental information and transmit this multiplexed information as a digital signal;
    receive means for receiving EPG data and program data; and
    control means for extracting said supplemental information including the category of the program from said EPG data, and to control selection of a recording media to record said program data based on the category of the program.

* * * * *